April 21, 1931. A. M. HOUSER 1,801,960
ANTIFRICTION CARRIAGE FOR VALVE DISKS
Filed Oct. 8, 1928 3 Sheets-Sheet 2
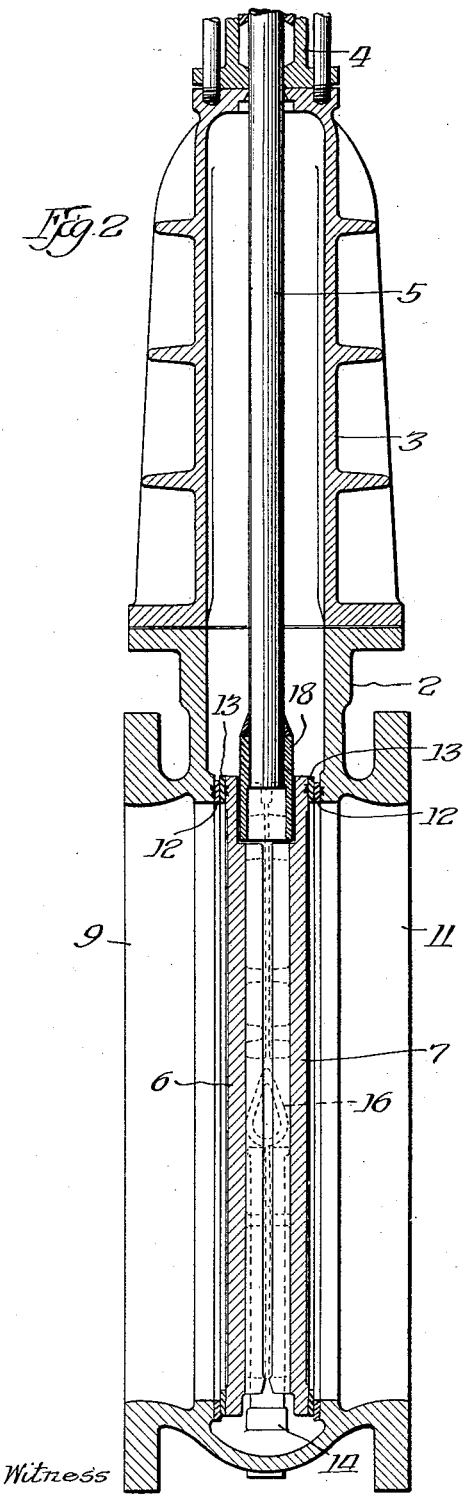
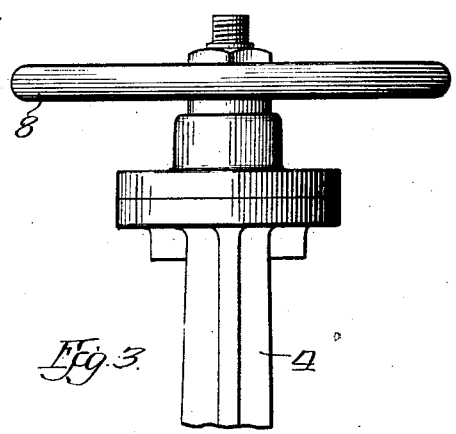
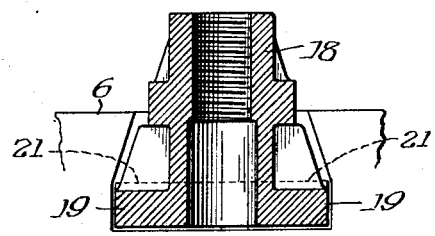
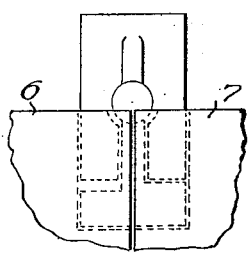
Inventor:
Arthur M. Houser April 21, 1931. A. M. HOUSER 1,801,960
ANTIFRICTION CARRIAGE FOR VALVE DISKS
Filed Oct. 8, 1928   3 Sheets-Sheet 3
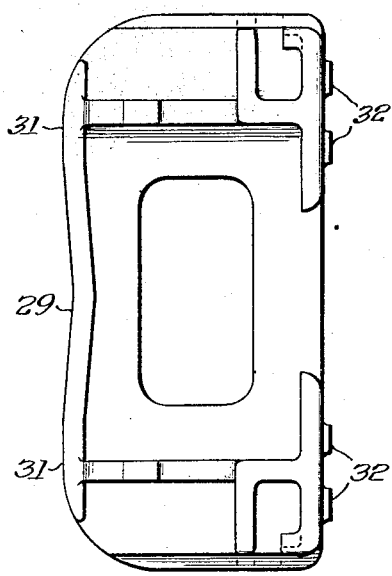
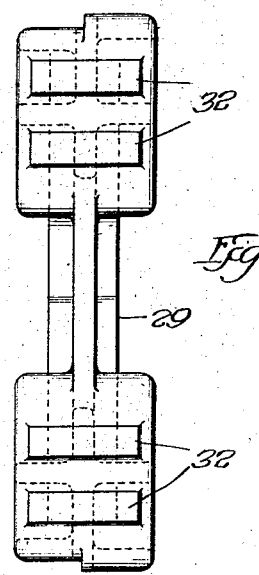
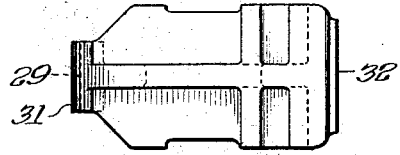
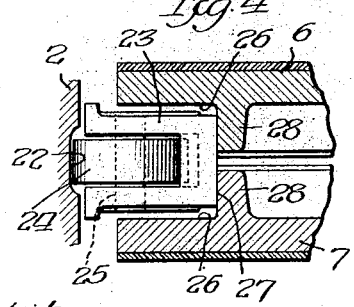
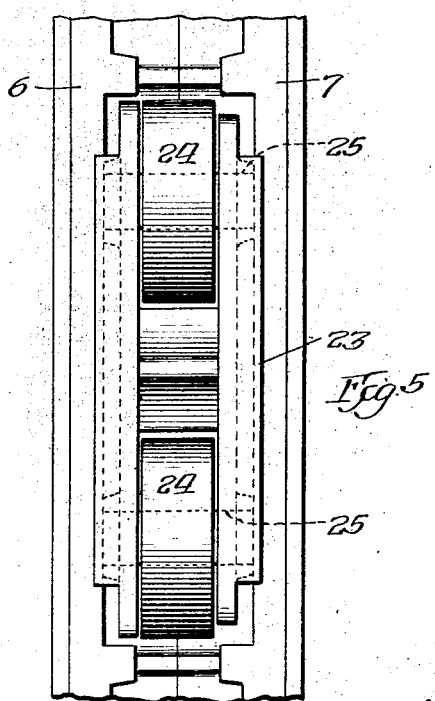

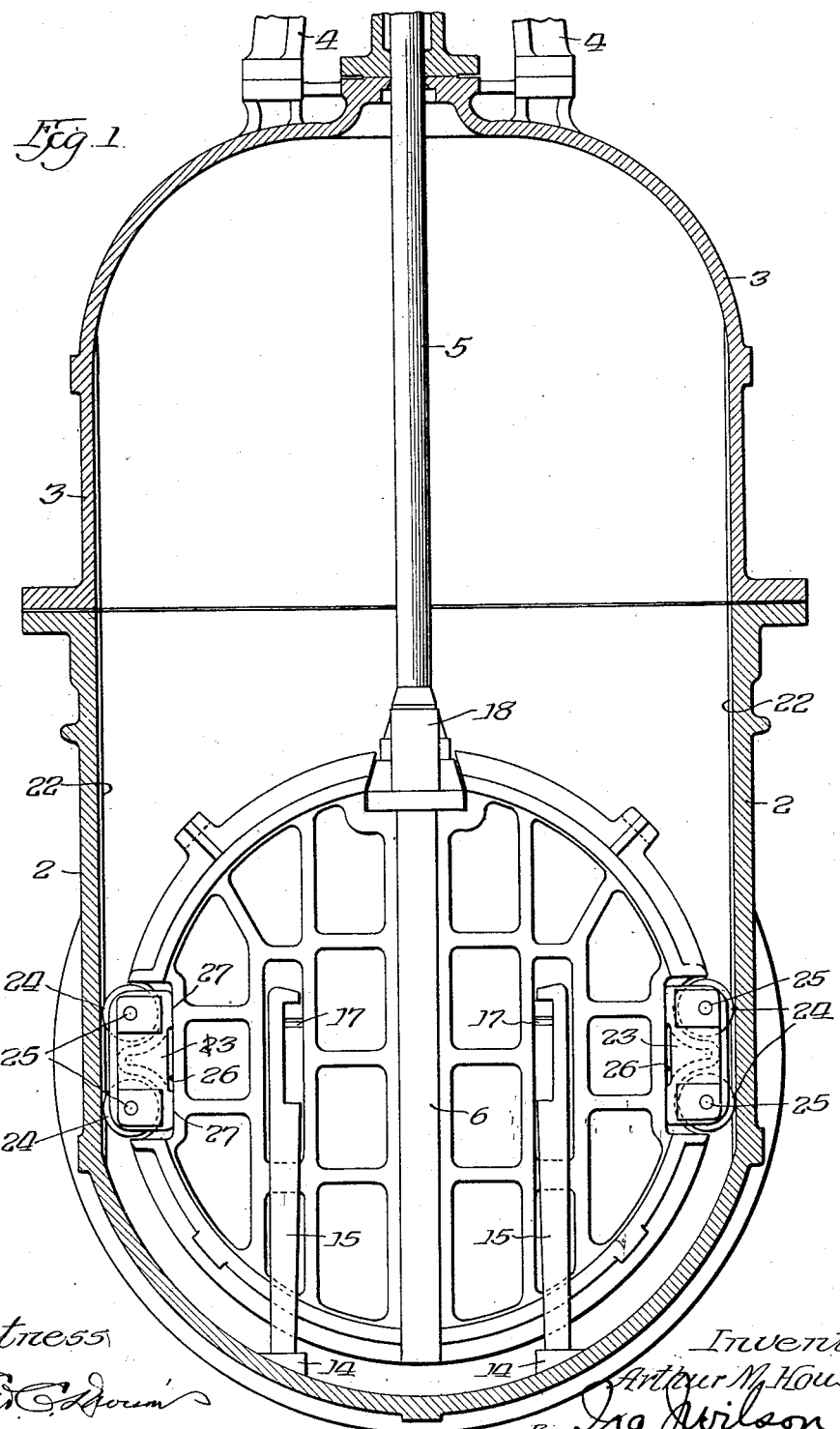

Patented Apr. 21, 1931

1,801,960

UNITED STATES PATENT OFFICE

ARTHUR M. HOUSER, OF OAK PARK, ILLINOIS, ASSIGNOR TO CRANE CO., OF CHICAGO, ILLINOIS, A CORPORATION OF ILLINOIS

ANTIFRICTION CARRIAGE FOR VALVE DISKS

Application filed October 8, 1928. Serial No. 310,998.

This invention pertains to valves and more particularly to mechanisms or devices for guiding the valve disks of large valves during their opening and closing movements and for facilitating such movements.

Large valves, such for instance as those of a 10-inch or larger size, because of the duty they are to perform, are ordinarily of the double disk type and are provided with wedging mechanisms for wedging the independent disks against their seats. The great weight of the operating parts, their enormous displacement and the stresses they must bear practically necessitate some form of anti-friction guides for the disks as they traverse their paths of movement during opening and closing movements. One of the most desirable arrangements for this purpose is illustrated in Fig. 37, page 21 of the Rensselaer Valve Company of Troy, New York, Catalog F, from which it will be noted that the valve disks are provided with roller pivots and rollers mounted on the pivots for engagement with guide grooves or guide surfaces formed in the valve body so that the disks or gates may be raised and lowered with a greater facility than otherwise.

Such construction, however, is open to a number of objections. The greatest objection lies in the fact that the roller axles or the rollers, or both, in time are so effected by the torsional stresses of movement of one disk with respect to the other or with respect to the valve body and the seats, or both, that smooth rolling action is seriously impaired. After a relatively short time of use, the operating parts become worn, jams or similar impediments to operation are of frequent occurrence and it becomes necessary to repair or replace the valve or the working parts, depending upon the place or places and extent of wear and injury. This construction also fails to provide a degree of flexibility that is desirable, as between the valve disks and the disks and body, and is not a construction providing for ease of assembly and disassembly for repair or replacement of parts, or other reasons. Furthermore, whenever it may be desired to remove the rollers from this type of valve it becomes necessary to remove the disks completely from the body with obvious disadvantages. Other disadvantages might be mentioned.

One of the primary objects of my invention therefore, is to provide a guide mechanism structurally independent of the valve disk or disks with which it is associated and cooperative with guide grooves or guide surfaces in the valve body for facilitating the raising and lowering of the disk or disks, and to provide an arrangement which will not bind on or between the disks, or on or between the disks and body during raising and lowering movements.

Another object is to provide carriages or guides which may be constructed with or without rollers, but if carrying rollers, will not permit the rollers to become misaligned or to bind upon the opearting parts or the valve body.

A further object is to provide a valve disk and guide construction so arranged that the valve disks need not be completely removed from the body, as has heretofore been necessary, whenever it is required or advisable that the guides and guideways be inspected or the guides repaired or replaced.

Many further objects as well as the advantages and uses of my invention will be or should become readily appreciated after reading the following description and claims and after viewing the drawings in which:

Fig. 1 is a vertical section through a valve body in a plane substantially parallel one of the valve seats and between the cooperative valve disks, Fig. 2 is a sectional elevation through the valve body taken substantially at right angles to the view of Fig. 1, Fig. 3 is an elevational view of a top fragment of the stem yoke and a handwheel for operating the valve, Figs. 4 and 5 are respectively enlarged fragmentary detail, plan and elevational views of a cooperative pair of valve gates or disks with a roller carriage form of my invention applied thereto, Figs. 6, 7 and 8 are respectively side and edge elevation and top plan views of a different form of guide or carriage, Fig. 9 is a fragmentary view of the top portion of a valve disk with the disk nut engaged therewith, and Fig. 10 is a fragmentary view of the top portions of adjacent valve disks showing the disk nut in place therebetween.

The valve illustrated comprises a body 2, a bonnet 3 forming a continuation of the body 2 and to which it is attached, a yoke structure 4 attached to the bonnet, a rising stem 5 projecting through the yoke structure and bonnet into the valve body, a pair of disks 6 and 7 which are substantially identical in construction or at least complementary to one another, and a handwheel or other operating means 8 for raising and lowering the stem 5 and gates or disks 6 and 7. The body is provided with oppositely disposed ports 9 and 11 about the interior openings of which are seats 12 adapted to coöperate with seats 13 secured to the disks 6 and 7. In the body of the valve adjacent the bottom thereof and on either side of the valve axis is an abutment 14 with each of which a wedge hook 15 is adapted to engage for limiting the downward movement of wedges 16 (one shown) and causing the wedges 16 to spread the disks or gates apart and their seats into fluid tight engagement with the seats 12, the sides of the wedges 16 engaging with beveled shoulders 17 on opposed disks to effect the wedging.

The stem 5 engages and is secured to what is termed a disk nut 18 which is provided with projections 19—19 and 21—21, the first of which are adapted to be received in recesses in the top portion of the disk 7 and the latter of which are adapted to be received in recesses in the top portion of the disk 6. These recesses in the top portions of the disks are provided by suitable shoulders spaced apart equal distances in the two disks, but since the projections 19 are narrower than the projections 21, one disk will have a slight lead over the other in the movement toward port closed position and the other disk will have a slight lead over the first in movement from port closed position. This arrangement insures the engagement of the hooks 15 with the abutments 14 before the lagging disk reaches its proper position in front of the port and the wedging commences. Suitable clearances are of course provided.

The body on each lateral side between the ports 9 and 11 is provided with a track, in this case, a groove 22, and the bonnet on each lateral side is provided with a continuation of each groove or track. These tracks are adapted to receive and/or guide, roller carriages or sliding shoe carriages mounted between the disks or gates 6 and 7. The roller carriages illustrated in Figs. 1, 4 and 5 comprise skeleton frames 23 of U-shape in cross section between the sides of which each carries a pair of rollers 24 mounted on pivots 25.

The rollers 24 are preferably rotatably mounted on the pivots 25 and the pivots 25 non-rotatably secured to the carriages, but if desired, the rollers may be non-rotatably secured to the pivots and the pivots rotatably secured in the carirages. The disks on each side are of course provided with suitable recesses 26, adjacent recesses in cooperative disks being complementary, for reception of the roller carriages, each of which is preferably provided with a pair of abutment shoulders 27 extending transversely across its inner face or edge for abutment against shoulders provided by ribs 28 integral with the disks and determining the depth of the recesses 26. Sufficient clearance is provided between the sides and top and bottom ends of the carriages 23 and the disks to provide a reasonable amount of play laterally and longitudinally of the carriages, and likewise a reasonable amount of clearance is provided between the carriages and the valve body so that there will be room for expansion and contraction, etc. As the valve disks are raised and lowered the carriages are drawn up or dropped down with the disks and the rollers 24 track in their respective grooves and guide the disks.

In Figs. 6, 7 and 8 I have illustrated an alternative form of guiding element or shoe adapted to take the place of the carriage 23. In this modification a flange 29 has flat bearing portions 31 which take the place of the rollers 24 and slide in the guideways or tracks 22 and two pairs of abutment shoulders 32 adapted to take the place of the abutment shoulders 27.

Since the disk guiding elements described, the roller carriages 23 and sliding shoe carriages illustrated in Figs. 6, 7 and 8, are independent of both disks and are loosely disposed in the complementary recesses of the disks, they cannot become misaligned by reason of torsional or swinging or other movements of the disk and therefore do not jam in the body. Stresses which would be imposed on prior disk roller constructions by reason of misalignment of one or the other of the disks are of course entirely eliminated by my construction in which the guide carriages are full floating; hence the carriages and rollers have a much longer useful life. It will be fully appreciated that the carriages and disks may be assembled and disassembled very easily for any purpose and in the fact that the disks need not be completely removed from the body for removal of the carriages as in prior constructions. With carriages designed in accordance with the invention, it is simply necessary to raise the disks high enough for the carriages to clear the bonnet flange on the body where they may be slipped in or out of the recesses quite readily.

While I have illustrated and described two particular forms of the invention, the invention is susceptible of embodiment in other forms bearing little constructional similarity to the forms illustrated, and for this reason I do not desire to be limited except by the spirit of the invention and the scope of the appended claims.

I claim:

1. In a valve of relatively large size, a body provided with substantially oppositely disposed ports, a pair of disks, one for closing each of said ports, said disks being disposed adjacent one another in back to back relationship and having complementary recesses in the lateral edges of their backs, means for moving said disks substantially together for opening and closing said ports, a track on each interior side of said body between said ports and extending substantially parallel the paths of movements of said disks, and bearing carriages having guiding means therein loosely and removably disposed in said recesses and cooperative with said tracks for guiding said disks during opening and closing movements thereof said carriages being independent of each other.

2. In a valve of relatively large size, a body provided with substantially oppositely disposed ports, a pair of disks, one for closing each of said ports, said disks being disposed adjacent one another in back to back relationship and having laterally disposed complementary recesses in the edges of their backs, means for moving said disks substantially together for opening and closing said ports, a track on each interior side of said body between said ports and extending substantially parallel the paths of movements of said disks, and a carriage having rollers therein loosely mounted in each complementary pair of recesses to float therein and engaging said tracks for guiding said disks during opening and closing movements thereof, said carriages being independent of each other.

3. In a valve having a body provided with a port, a closure member mounted in said body for movements for opening and closing said port, said member having a pair of diametrically opposite recesses in the edge thereof, means for moving said member toward and from said port and independent carriages disposed in each of said recesses and bodily movable therein in a direction toward and from the seating faces of said closure member and engageable with interior portions of said body for guiding said member during movements toward and from said seat.

4. In a valve having a body provided with a port, a closure member mounted in said body for movements toward and from said port, a pair of diametrically disposed carriages mounted within said member for independent floating bodily movements relative to said member and a roller rotatably secured in each of said carriages and engageable with interior portions of the valve body for guiding said member during its movements toward and from said port.

In witness of the foregoing I affix my signature.

ARTHUR M. HOUSER.